United States Patent
Gordon et al.

(10) Patent No.: US 7,491,948 B2
(45) Date of Patent: Feb. 17, 2009

(54) METHOD OF DETECTING AND TRANSMITTING RADIATION DETECTION INFORMATION TO A NETWORK

(75) Inventors: Michael S. Gordon, Yorktown Heights, NY (US); Kenneth P. Rodbell, Sandy Hook, CT (US); Robert L. Wisnieff, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/342,429

(22) Filed: Jan. 30, 2006

(65) Prior Publication Data

US 2008/0308747 A1    Dec. 18, 2008

(51) Int. Cl.
*G01T 3/00* (2006.01)

(52) U.S. Cl. .............. 250/472.1; 250/370.01; 250/390.01; 438/56; 365/205

(58) Field of Classification Search ............ 438/56
See application file for complete search history.

(56) References Cited

U.S. PATENT DOCUMENTS

| | | | | |
|---|---|---|---|---|
| 4,642,463 | A * | 2/1987 | Thoms | 250/336.1 |
| 6,211,692 | B1 * | 4/2001 | Shabde et al. | 324/765 |
| 6,298,229 | B1 * | 10/2001 | Tomlinson et al. | 455/404.2 |
| 6,650,583 | B2 * | 11/2003 | Haraguchi et al. | 365/201 |
| 6,798,688 | B2 * | 9/2004 | Joshi | 365/154 |
| 6,867,444 | B1 * | 3/2005 | Hughes | 257/252 |
| 7,106,642 | B2 * | 9/2006 | Hojo | 365/200 |
| 2004/0119591 | A1 * | 6/2004 | Peeters | 340/539.26 |
| 2004/0125676 | A1 * | 7/2004 | Osada et al. | 365/201 |
| 2004/0232323 | A1 * | 11/2004 | Bosco et al. | 250/253 |
| 2005/0023633 | A1 * | 2/2005 | Yeo et al. | 257/500 |
| 2005/0082489 | A1 * | 4/2005 | August et al. | 250/370.05 |
| 2006/0036619 | A1 * | 2/2006 | Fuerst et al. | 707/100 |
| 2006/0097171 | A1 * | 5/2006 | Balchunas et al. | 250/336.1 |

FOREIGN PATENT DOCUMENTS

WO    WO2004/073326    *    2/2004

OTHER PUBLICATIONS

Hnateck, Eugene, Integrated Circuit Quality and Reliability; Second Edition, Revised and Expanded; Marcel Dekker, Inc.; 1995; p. 160.*
Chou, et al. "Evaluation of High Density DRAMs as a Nuclear Radiation Detector", Applied Radiation Isot., vol. 48, No. 10-12, pp. 1601-1604, Elsevier Science, Ltd. 1997.*

* cited by examiner

*Primary Examiner*—David P Porta
*Assistant Examiner*—Yara B Green
(74) *Attorney, Agent, or Firm*—Schmeiser, Olsen & Watts; Robert M. Trepp

(57) ABSTRACT

A method of detecting and transmitting radiation detection information to a network. The method including: communicating with one or more personal radiation detection devices, each device including, a host memory, an event memory, a microprocessor, a global positioning unit and a transceiver or a transmitter; a radiation shield around the host memory and the event memory; a radiation detection memory, the radiation detection memory, responsive to alpha radiation and including two or more SRAM arrays including cross-coupled invertors coupled to wordlines through different value capacitors; a conversion device including a material able to convert neutron and/or gamma radiation into alpha radiation; and an event detection circuit configured to detect and to store data relative to detection of the alpha radiation events by the radiation detection memory; storing the data in the event memory; and retrieving, in a reading device of the network, the data stored in the event memory.

9 Claims, 9 Drawing Sheets

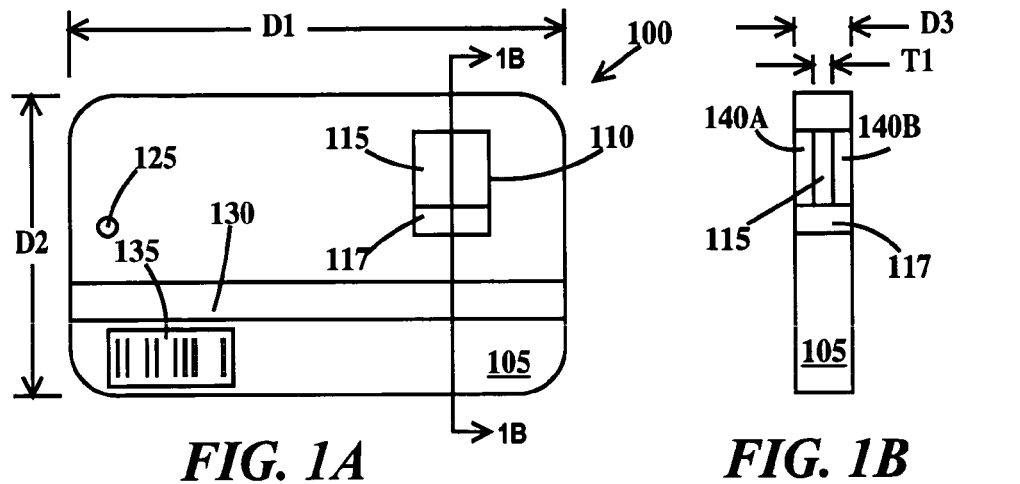
FIG. 1A  FIG. 1B
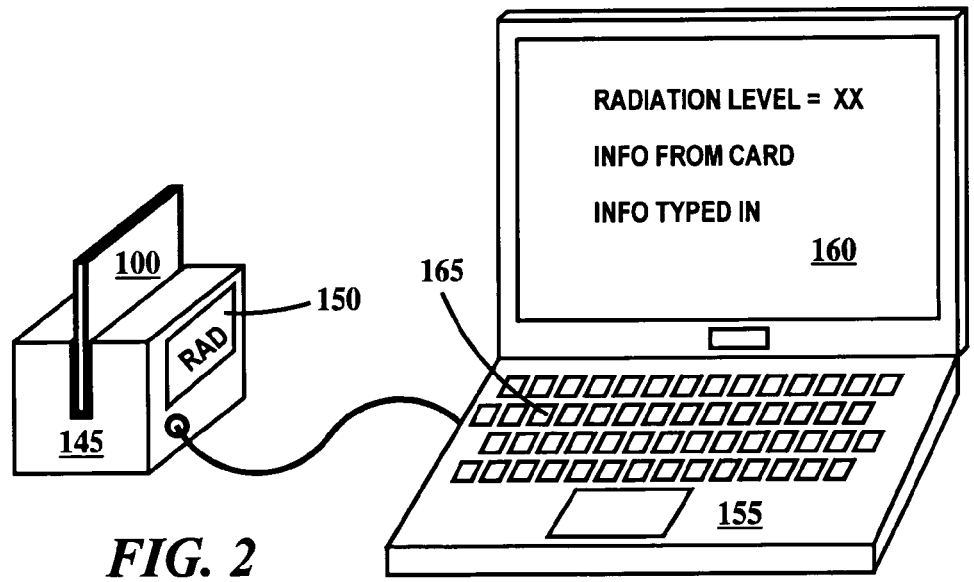
FIG. 2

METHOD OF DETECTING AND TRANSMITTING RADIATION DETECTION INFORMATION TO A NETWORK

FIELD OF THE INVENTION

The present invention relates to the field of radiation detection; more specifically, it relates to radiation detection schemes and apparatus and methods of transmitting radiation detection information to a network.

BACKGROUND OF THE INVENTION

In the event of a nuclear event such as a conventional or "dirty" nuclear weapon occurring in a metropolitan, suburban or rural area, there are two problems that would arise immediately for healthcare providers and first responders. The first problem would be determining the extent of radiation exposure for persons brought to hospitals or being treated by first responders. In the case where there is a large numbers of potential victims and limited healthcare resources, triage becomes essential, but there is currently no way to perform radiation exposure triage absent physical symptoms, and wherein those physical symptoms can be unreliable. The second problem is determining both the geographic extent and exposure level distribution of the radiation event as well as determining an estimate of the number of potential victims in the area effected.

Therefore, there is a need for radiation detection schemes and apparatus and methods of transmitting radiation detection information to networks that address healthcare triage and an estimate of the radiation level and potential victim geographical distributions.

SUMMARY OF THE INVENTION

An aspect of the present invention is a method, comprising: communicating with one or more personal radiation detection devices, each personal radiation detection device of the one or more personal radiation detection devices comprising: a host device including, a host memory, an event memory, a microprocessor, a global positioning unit and a transceiver or a transmitter; a radiation shield around the host memory and the event memory; a radiation detection memory, the radiation detection memory responsive to alpha radiation, the radiation detection memory comprised of two or more SRAM arrays, each SRAM of the two or more SRAM arrays array comprising cross-coupled invertors coupled to bitlines through pass-gate field effect transistors, gates of the pass-gate field effect transistors coupled to wordlines through capacitors, capacitors of different SRAM arrays of the two or more SRAM arrays having capacitors of different capacitance; a conversion device proximate to the radiation detection memory, the conversion device comprising a material able to convert neutron, gamma or neutron and gamma radiation into alpha radiation; and an event detection circuit within the host device, the event detection circuit configured to detect and to store data relative to detection of the alpha radiation events by the radiation detection memory in the event memory, the data including a soft error fail rate of each SRAM array of the radiation detection memory and a location of the personal radiation detection device when the alpha radiation was detected; storing the data in the event memory; retrieving, in a reading device, the data stored in the event memory; determining, in the reading device, a radiation dose the host device has been exposed to based on data stored in the event memory; and displaying (i) on a display unit of the reading device, the radiation dose and a location of the personal radiation detection device when the alpha radiation event was detected, (ii) on a computer screen of a computer linked to the reading device or (iii) on the display unit of the reading device and on the computer screen of the computer.

BRIEF DESCRIPTION OF DRAWINGS

The features of the invention are set forth in the appended claims. The invention itself, however, will be best understood by reference to the following detailed description of an illustrative embodiment when read in conjunction with the accompanying drawings, wherein:

FIG. 1A is a plan view and FIG. 1B is a cross-section view through line 1B-1B of a passive radiation detection device according to a first embodiment of the present invention;

FIG. 2 is a schematic diagram of a scheme for collecting radiation detection information according to the first embodiment of the present invention;

DETAILED DESCRIPTION OF THE INVENTION

Figure 3:
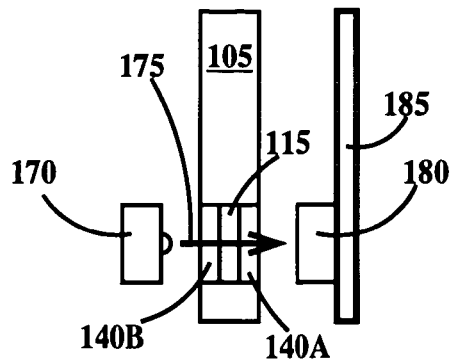
FIG. 3 is a schematic diagram illustrating a method of reading a passive radiation device according to the first embodiment of the present invention.

A passive radiation detection device is a device that requires little or no power in order to detect and store a radiation exposure event. An active radiation detection device is a device that requires power in order to either detect a radiation exposure event, record data relating to a radiation exposure event or both detect the radiation exposure event and record data relating to the radiation exposure event. A radiation exposure event is a release of alpha (Helium nuclei), beta, gamma or neutron or other radioactive species (such as radioactive isotopes like $^{131}$I). The term radiation includes fluxes of alpha particles, beta particles, X-rays, gamma rays and neutrons, also commonly referred to as ionizing radiation, as well as fluxes of radioactive isotope particles that generate alpha particles, beta particles, X-rays and gamma rays. The term ionizing radiation means radiation (as described supra) of sufficient energy to cause ionization of the medium through which it passes.

It is commonly noted that an exposure of about 2.5 grays (250 rads) will cause death in 50% of the population within 60 days. In one example, the various radiation detection devices according to embodiments of the present invention advantageously are capable of detecting radiation dosages of up to 500 rads or 5 grays in increments of between 10 or less rads for total dosages below about 100 rads and increments of 25 rads or less for total dosages of above about 100 rads.

FIG. 1A is a plan view and FIG. 1B is a cross-section view through line 1B-1B of a passive radiation detection device according to a first embodiment of the present invention. In FIG. 1A, a passive radiation device 100 includes a body 105, an opening 110 (or a window 110) in the body and a radiation detection layer 115 within opening 110. Body 105 may be formed from plastic or metal. While primarily intended to be used with a reading device for improved accuracy, and for archiving or recording the exposure, opening 110 may include an optional reference region 117, insensitive to radiation, but having a set of regions varying in optical density, color or color intensity corresponding to a known dose of radiation that may be manually compared (by a person looking through opening 110) to the optical density, color or color intensity of radiation detection layer 115. Alternatively, a comparison can be made between radiation detection layer 115 and reference region 117 located on the side of the detector.

In one example body 105 has about the same dimensions (form factor) as commonly used credit cards. Common credit cards have a length dimension D1 of between about 82 mm (2.88 inches) and about 89 mm (about 3.25 inches), a width dimension D2 of between about 53 mm (2.1 inches) and about 67 mm (about 2.63 inches) and a thickness dimension D3 of between about 0.254 mm (0.10 inches) and about 1.02 mm (about 0.040 inches). In one example, the radiation detection device is a specially issued hospital or medical identification card. In another example, radiation detection device 100 is an actual credit card or driver's license fitted with opening 110 and radiation detection layer 115 and optional set of reference regions 117. Radiation detection layer comprises a material that undergoes a change in physical property upon exposure to radiation types described supra that requires no further processing (i.e. developing or other chemical, electrical or magnetic treatment) to be detectable by a reading device (described infra). In one example, the optical density (amount of light transmitted through radiation detection layer 115) changes. Examples of other physical properties of radiation detection layer 115 that may change upon exposure to the radiation types described supra, include color, color intensity (vividness of hue), electrical conductance, capacitance and tensile strength or stiffness (resistance to bending).

In one example, radiation detection device 100 is about the size of a typical customer identification tag commonly issued by grocery stores and other businesses and intended to be attached to a key chain. In this example, radiation detection device 100 may include a small through hole 125.

In one example, radiation detection device is a military identification tag fitted with opening 110 and radiation detection layer 115 and optional set of reference regions 117.

Radiation detection device 100 may include an optional magnetic stripe 130 and/or an optional bar code 135 encoding various identification and/or logistic information. In FIG. 1B, radiation detection layer 115 has a thickness TI and is protected by protective layers 140A and 140B on either side of the radiation detection layer. The thickness and material of the protective layers 140A and 140B are advantageously selected so as to not materially attenuate the radiation flux reaching the detector.

FIG. 2 is a schematic diagram of a scheme for collecting radiation detection information according to the first embodiment of the present invention. In FIG. 2 radiation detection device 100 is read by a reading device 145 having a display 150. Reading device 145 may be linked to a computer 155 or operated in stand-alone fashion without the computer. Computer 155 displays on a screen a reading of the amount of radiation (expressed as a radiation dose, for example in rads or grays, a gray=100 rads) that has impinged on radiation detection layer 115 (see FIGS. 1A and 1B) which is indicative of the level of radiation a person carrying radiation detection device 100 has been exposed to. Other information read from magnetic stripe 130 (see FIG. 1A) or bar code 135 (see FIG. 1A) may also be displayed such as personal information like name, social security number, medical plan identification number, etc. Additionally information entered into computer 155 from keyboard 165 may be displayed. This information entered via keyboard 165 may include such information as to the medical condition or location where the person carrying radiation detection device 100 was found. Computer 155 may add a time/date/location stamp to the information displayed on screen 160 and distribute the information to an intranet or internet network.

In one example, the information collected, particularly the radiation dose data would be used for triage purposes in order to determine the medical treatment required as well as to determine if treatment is required by the particular treatment protocol in effect.

It should be understood, while reading devices 145 and computers 155 are advantageously located in a hospital or other emergency facilities, reading devices 145 alone or with computers 155 may be located in emergency response vehicles.

FIG. 3 is a schematic diagram illustrating a method of reading a passive radiation device according to the first embodiment of the present invention. In FIG. 3, light source 170 (emitting, for example, ultraviolet, visible, or infrared light) directs a light beam 175 through protective layers 140A and 140B and radiation detection layer 115 onto a detector 180 that measures the intensity, color or other attributes of the light passing through. Electronics 185 convert the intensity, color, or other attribute, reading into a radiation exposure dose that may be displayed on display 150 (see FIG. 2) or on computer screen 160 (see FIG. 2). This scheme is advantageously employed when the optical density, color or color intensity of radiation detection layer 115 changes upon exposure to radiation (i.e. lightens or darkens).

One of ordinary skill in the art would be able to construct reading devices capable of measuring the electrical resistance, electrical conductance or tensile strength of radiation detection layer 115.

Figure 4A:
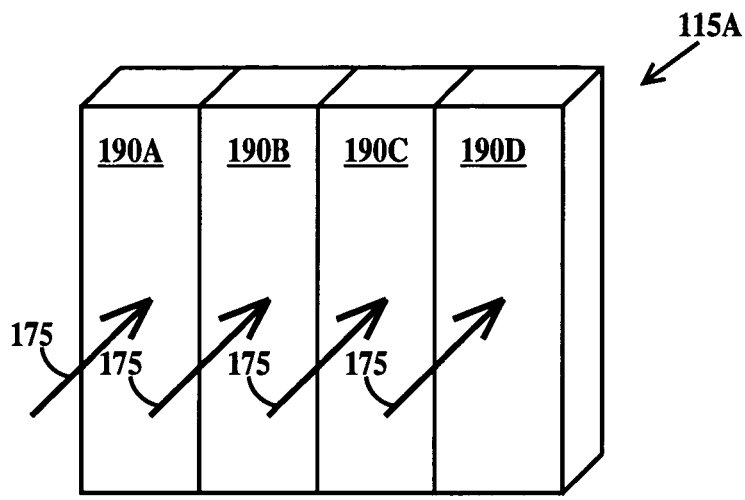
FIGS. 4A and 4B are isometric views of alternative passive radiation detection event detecting elements according to the first embodiment of the present invention.
Figure 4B:
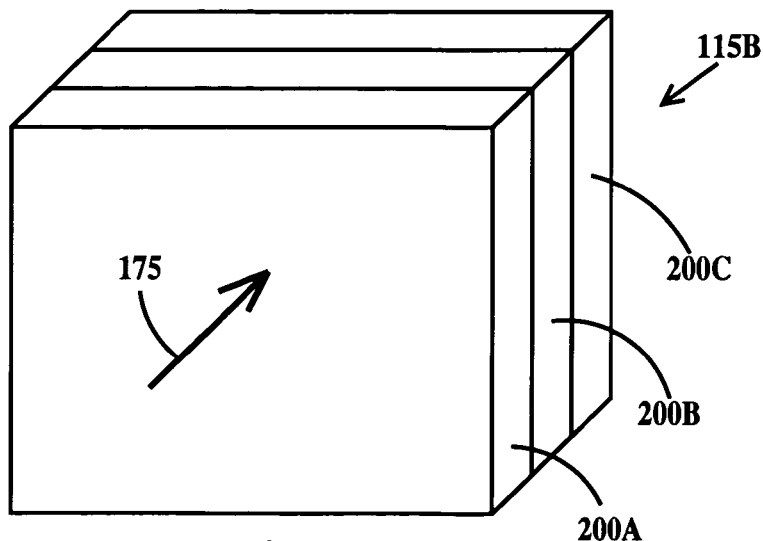

FIGS. 4A, and 4B are isometric views of alternative passive radiation detection event detecting elements according to the first embodiment of the present invention. In FIG. 4A, an event detection layer 115A comprises a set of strips 190A, 190B, 190C and 190D, each sensitive to a different amount of nuclear radiation. For example, strip 190A could be sensitive to radiation in the 0-50 rads range, strip 190B sensitive to radiation in the 50-100 rads range strip 190C sensitive to radiation in the 100-250 rads range and strip 190D sensitive to radiation in the 250-500 rads range. An array of light sources 170 (see FIG. 3) and detectors 180 (see FIG. 3) would then be employed, each measuring the optical density, color or other attribute of a different strip. In this example, reading device 145 (see FIG. 2) would then be capable of providing a range of dose that was absorbed. Those skilled in the art will recognize that alternative embodiments could be employed, for instance additional strips to help distinguish the radiation level in finer increments, and the array of light sources 170 could be replaced with a single scanning light source capable of sequentially scanning each strip.

Alternatively, the use of a reading device could be dispensed with and event detection layer 115B "read" with the unaided eye by holding radiation detection device 110 (see FIG. 1A) to a visible light source by simply noting which strips had darkened (or lightened), changed color, or changed in some other attribute by comparing it to the attached reference.

In FIG. 4B, an event detection layer 115B comprises a set of overlaid layers 200A, 200B, and 200C each tailored to be sensitive to a different type of nuclear radiation by selection of the layer thicknesses. Since alpha particles have short range (less than about 100 microns in most materials), alpha particles will be stopped in layer 200A. Beta particles have intermediate range and will be stopped in a few millimeters of material. Gamma-rays have long range since they are not electrically-charged and would easily penetrate layers 200A and 200B. If layers 200C and 200B were of equivalent thickness, then the response of layer 200B will be from beta particles and gamma-rays and the response of layer 200C from gamma-rays only. The difference in response between layers would then give the response to betas. In one example, layer 200A has a thickness of 0.1 mm or less thin, and layers 200B and 200C have the same thickness of 5 mm or greater.

Returning to FIGS. 1A and 1B, radiation detection layer 115 (see the discussion infra) is also applicable to radiation detection layer 115A, and 115B of respective FIGS. 4A, and 4B may comprise a solid layer of radiation sensitive material, a layer of radiation sensitive material comprised of a mixture of different radiation materials, some or all of the different radiation materials responsive to different types of radiations or thin coatings of a single radiation sensitive material or of a mixture of different radiation materials applied to a backing material.

U.S. Pat. No. 4,975,222 teaches methods for making passive detectors using conductive polymers and radiation sensitive materials and is hereby incorporated by reference. Radiation detector layers 115A and 115B may include conductive polymers which have variable electrical conductivity and/or absorption spectrum by doping with dopants described infra. The polymers include, for example, polyacetylene, polythiophene, polypyrrole, polyfuran, polyselenophene, poly-para-phenylene, poly-para-phenylenesulfide, polyaniline, poly-para-phenylenevinylene, poly-para-phenyleneoxide and polyheptadiyne. Radiation detector layers 115A and 115B may include materials which decompose and/or dissociate by exposure to radiation including electron beams, gamma-, alpha-, beta- and X-rays and neutron beams, and generate the substance composing the dopant of the above-described conductive polymers. These radiation sensitive materials include, for example, metal halides such as silver chloride, silver bromide, ferric fluoride, cupric fluoride, lead (II) iodide, bismith(III) iodide, cuprous iodide, silver iodide, cadmium iodide and diaryliodonium, triarylsulfonium and aryldiazonium salts having anions such as fluoride ion, chloride ion, bromide ion, iodide ion, perchlorate ion, tetrafluoroborate ion, hexafluorophosphate(V) ion, hexafluoroarsenate(V) ion and hexafluoroantimonate(V) ion. Radiation detector layers 115A and 115B may be solid matter consisting of the conductive polymers and the radiation sensitive materials. The solid matter is prepared by the following processes. In the first process, radiation sensitive materials are dispersed into or combined with the conductive polymers. In the second process, a layer of the solid conductive polymers is lapped with the layer of radiation sensitive materials or the layer containing the same. The actual procedures of these processes include immersion of the conductive polymers into the solution containing the radiation sensitive materials, compounding of the radiation sensitive materials in the molding step of the conductive polymers, co-polymerization of the conductive polymers with pendant radiation sensitive materials, and preparation of laminated structure by alternatively piling up conductive polymer films having proper thickness with other films obtained by impregnating the radiation sensitive materials into, for example, a polymer matrix.

Figure 5:
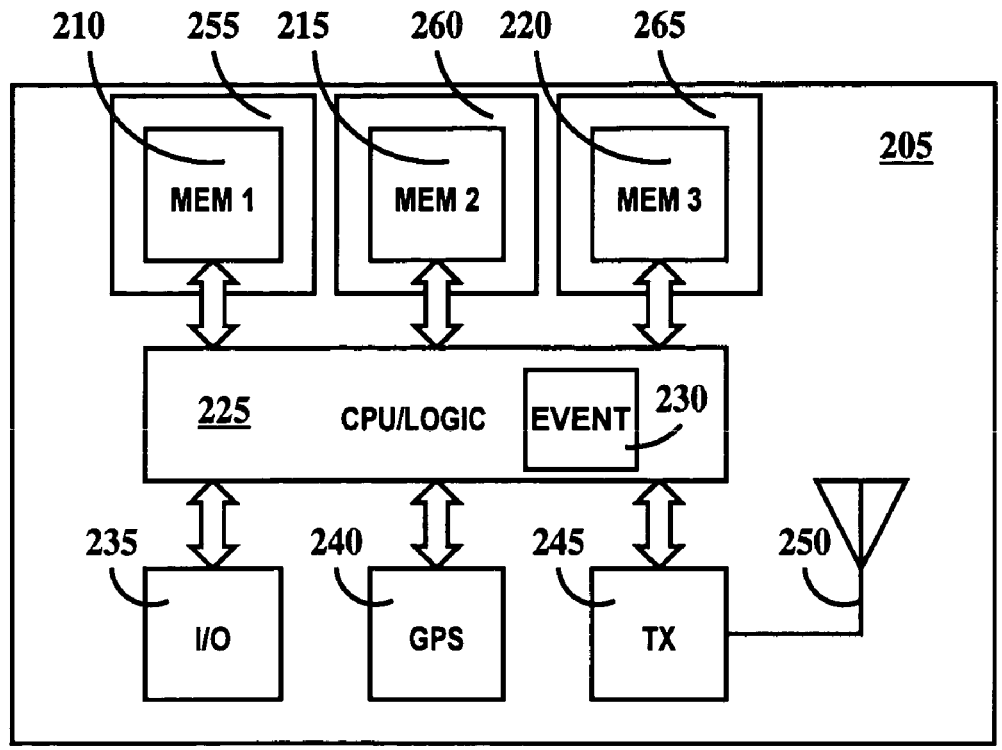
FIG. 5 is a schematic diagram of an active radiation detection device according to a second embodiment of the present invention.

FIG. 5 is a schematic diagram of an active radiation detection device according to a second embodiment of the present invention. In FIG. 5, a host device includes a first memory array 210 for detecting a radiation exposure event, a second memory array 215 for storing information relating to the radiation exposure event, a third memory 220 which functions as the normal memory of the host device, a microprocessor (CPU)/logic circuit 225 including a radiation exposure event detection/control circuit 230, an optional I/O device (i.e. a cable socket) an optional global positioning unit 240, a transmitter or transceiver 245 and an antenna 250, all electronically coupled together. Alternatively, second memory 215 may be incorporated into radiation exposure event detection/control circuit 230. Positioned over and under first memory array 210 are alpha particle generating plates 255. Positioned over and under second and third memory arrays 215 and 220 respectively are optional radiation blocking shields 260 and 265 to radiation-harden the memory since this memory is used to store the information on the radiation information from first memory array 210.

First memory array 210 is adapted to be sensitive to alpha particles generating soft errors as explained infra. Second memory array 215 is adapted to store data relating to soft error events occurring in first memory array 210 and thus may be fitted with radiation blocking shields 260 to prevent the data from being altered by the present or subsequent radiation exposure events. Radiation exposure event detection/control circuit 230 detects soft errors in first memory array 210 and stores the number of soft errors per unit of time plus a total number of soft errors detected over a predetermined length of time. The number of soft fails is proportional to the radiation received. Generally soft errors are corrected by normal memory refresh cycles.

Figure 9:
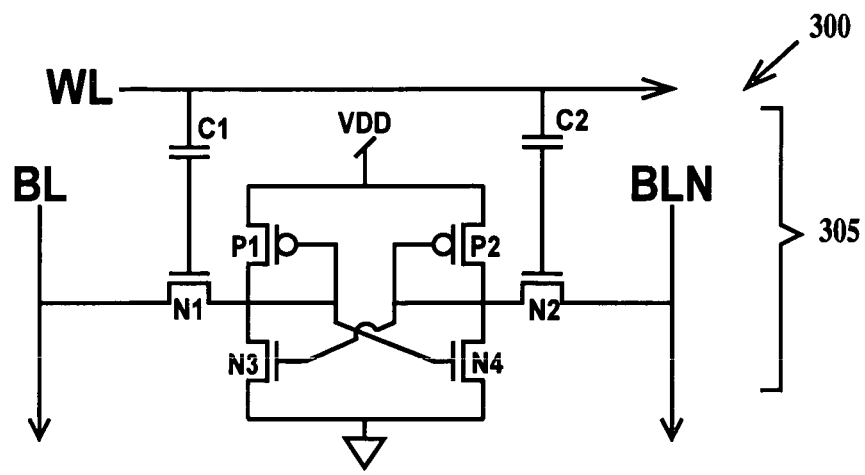
FIG. 9 is a schematic circuit diagram of a dynamic static random access memory (SRAM) array that may be used as an active radiation detection event detecting element according to the second embodiments of the present invention.

First memory array 210 may be fabricated so as to have a particular sensitivity to a radiation event. For example adding capacitances to critical paths, increasing the operating voltage, increasing the feature size, may be used to decrease a memory arrays soft error rate (SER). In one example, memory array 210 is comprised of six-transistor (6T) cells used in complementary metal-oxide-silicon (CMOS) static random access memory (SRAM) as illustrated in FIG. 9 and described infra.

In one example, host device 205 is a cell phone. In other examples, host device 205 is a personal digital assistant (PDA), a personal music or video device, an iPOD™ device or other MP3 player, a personal compact disk (CD) player, a personal computer (PC) such as a laptop computer, a handhelp global positioning system (GPS) unit, or a desktop computer, or any device with a memory array and a microprocessor.

Figure 13:
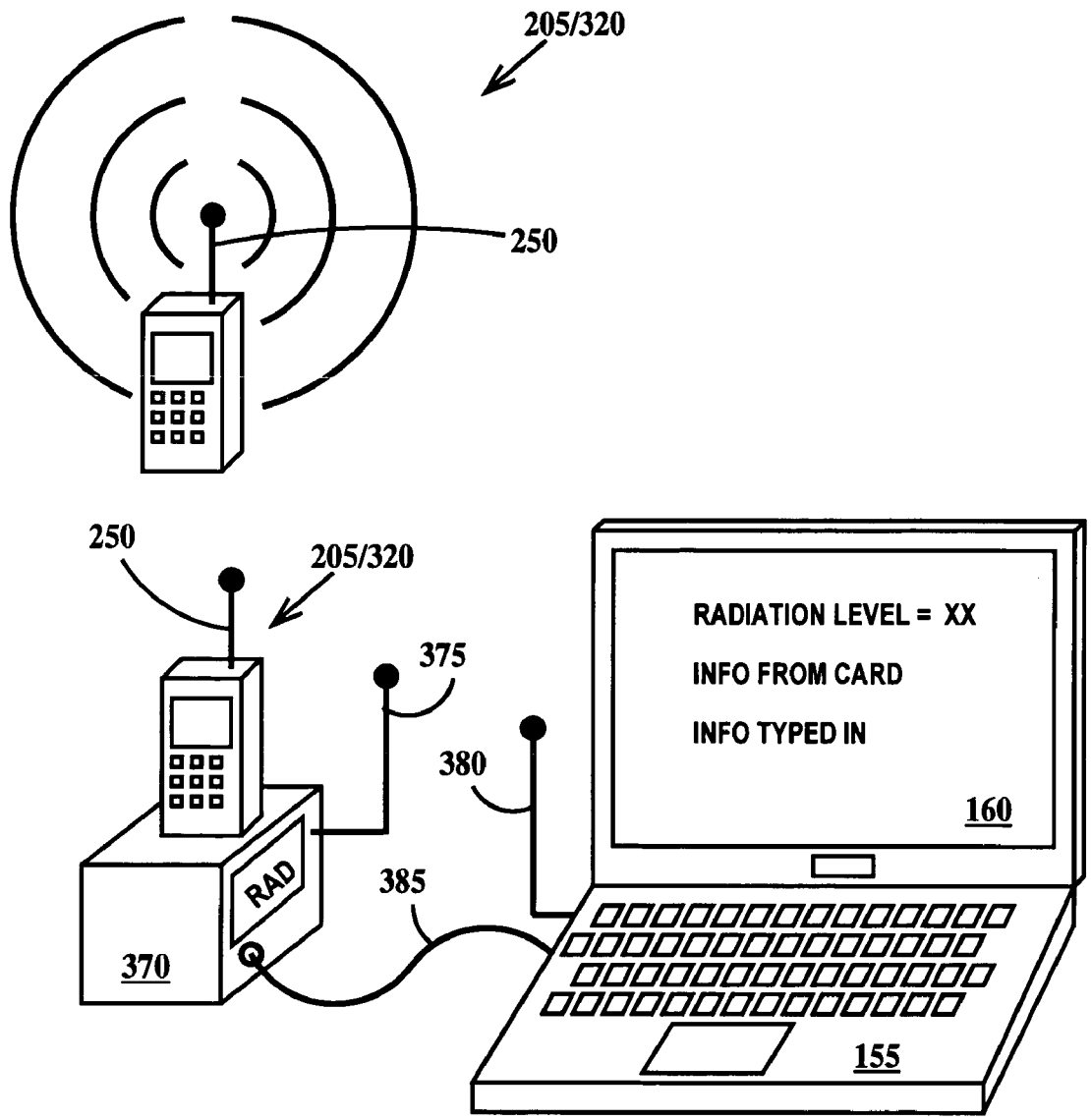
FIG. 13 is a schematic diagram of a scheme for collecting radiation detection information according to the second and third embodiment of the present invention.

There are several modes of operation of host device 205 besides its normal function depending upon the type of host device. In the example, host device 205 is a cell phone, radiation exposure event data can be transmitted by placing a phone call to an emergency telephone number immediately (turning the phone on if it is off) or upon the phone being turned on. Alternatively, the data can be downloaded wirelessly or through I/O device 235 to a reading device in close proximity as illustrated in FIG. 13 and described infra.

If host device 205 is a PDA, laptop, or a PC, the radiation exposure event data can be transmitted immediately (wirelessly or wired) via the internet (turning the PDA, laptop, or PC on if it is off) or upon the PC being turned on.

If host device 205 is equipped with GPS device 240, then the radiation exposure event data transmitted may include a precise location as well as radiation dosage and a date/time stamp.

If host device 205 is a cell phone, then the radiation exposure event data transmitted may include a general location based on the location of the nearest cell tower in communication with the cell phone as well as radiation dosage and a date/time stamp. The modern-generation of cellular phones all have GPS built into them to assist in locating the user in the event of a 911 (emergency call). More precise location information is available for cell phones if the interrogating system can take advantage of it.

Figure 6:
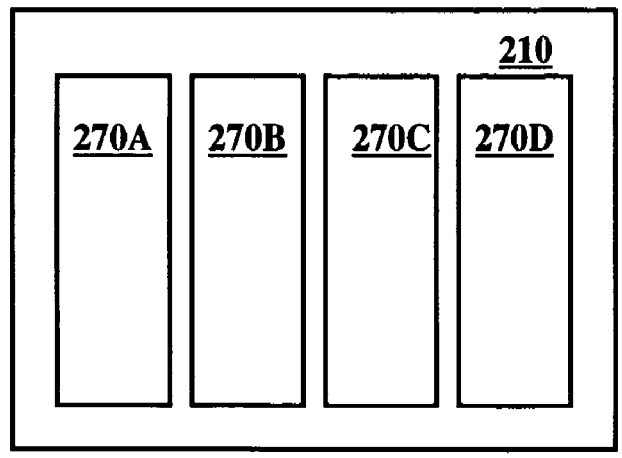
FIG. 6 is a plan view of a radiation detection element according to the second embodiment of the present invention.

FIG. 6 is a plan view of a radiation detection element according to the second embodiment of the present invention. In FIG. 6, first memory array 210 includes four sub-arrays 270A, 270B, 270C and 270D, each of which may be designed to be sensitive to different absorbed doses that trigger soft errors as will be described infra.

Figure 7:
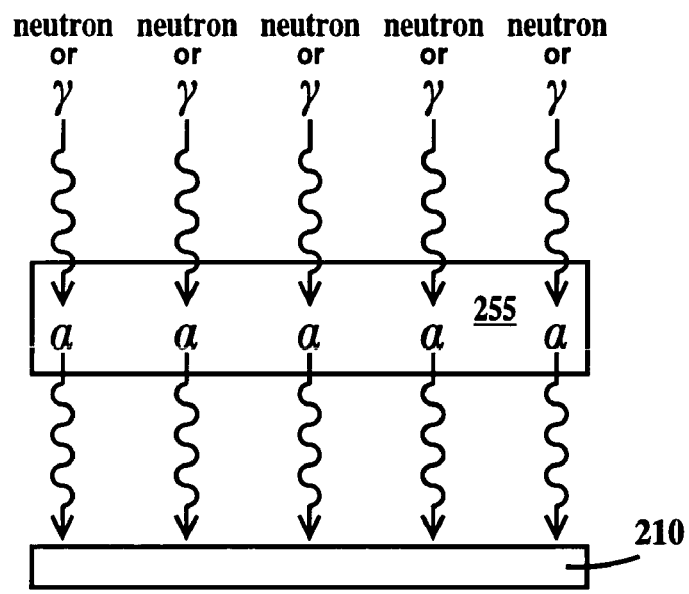
FIG. 7 is schematic diagrams illustrating active radiation detection elements according to the second embodiment of the present invention.

FIG. 7 is a schematic diagram illustrating active radiation detection elements according to the second embodiment of the present invention. Since only alpha particles are likely to cause soft errors in integrated circuit memory, neutron and gamma radiation can be converted to alpha particles by alpha particle generating plates 255. In FIG. 7, alpha particle generating plate 255 generates alpha particles upon being exposed to either neutron, gamma radiation or both. In one example, alpha particle generating plate 255 comprises a thin layer of material of high atomic number such that the alpha particles generated by the interaction of either or both neutrons or gamma-rays escape at large energy (several MeV). In one example, alpha particle generating plate 255 is fabricated from hafnium (Hf), tungsten (W), platinum (Pt), or other heavy elements where the interaction of either neutrons or gamma-rays has a positive Q-value for producing alpha particles for a majority of the naturally-occurring isotopes of the heavy element. A radiation detector using alpha particle generating plate 255 can be calibrated using a known flux of neutrons or gamma-rays at several discrete energies or with a "white" beam (containing various broad ranges of energies).

Alpha-particle generating plate 255 needs to be sufficiently thin compared to the range of the alpha particles so that the alpha particles emerge with enough energy to make it to the silicon layer of the memory device or cell. This places a physical limitation on how far away this plate can be relative to first memory array 210 since the alpha particle lose energy in air. For this reason, it is advantageous to use wire bonded integrated circuits.

Alternatively the backside of the silicon chip in which first memory array 210 is fabricated (or just the region of the backside of the silicon chip under the first memory array) may be doped, with the alpha-generating layer. In this embodiment, flip chip technology may be employed.

Figure 8:
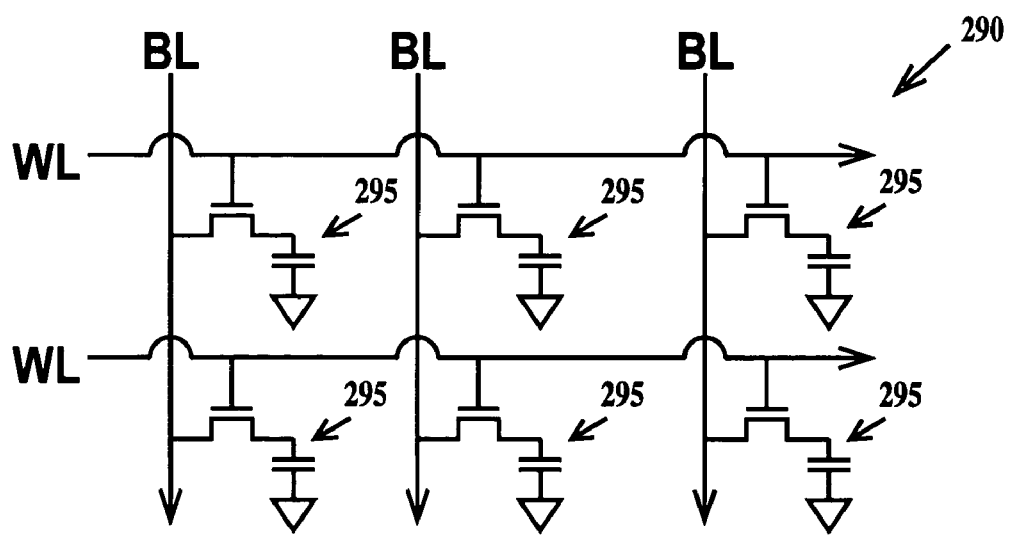
FIG. 8 is a schematic circuit diagram of a dynamic random access memory (DRAM) array that may be used as an active radiation detection event detecting element according to the second embodiment of the present invention.

FIG. 8 is a schematic circuit diagram of a DRAM array that may be used as an active radiation detection event detecting element according to the second embodiment of the present invention. In FIG. 8, a DRAM array 290 (suitable for use as first memory array 210 of FIG. 5) is comprised of rows in the wordline (WL) direction and columns in the bitline (BL) direction of DRAM cells 295. Each DRAM cell 295 comprises an NFET and a capacitor. The gate of each NFET is connected to a wordline, the drain of each NFET to a bitline and the source of each NFET to a first plate of a capacitor. A second plate of each capacitor is connected to ground.

The sensitivity of individual cells 295 to an alpha particle strike can be controlled by changing the capacitance of the capacitor (the lower the capacitance the more sensitive the cell, the higher the capacitance, the less sensitive the cell). In one example, in the pre-radiation exposure event (or pre soft error state) all cells in DRAM array 290 are storing a logical 1. In one example, in the pre-radiation exposure event (or pre soft error state) all cells in DRAM array 290 are storing a logical 0.

FIG. 9 is a schematic circuit diagram of a dynamic static random access memory (SRAM) array that may be used as an active radiation detection event detecting element according to the second embodiments of the present invention. In FIG. 9, an SRAM array 300 (suitable for use as first memory array 210 of FIG. 5) is comprised of a six transistor SRAM cell 305. In SRAM array 300 rows run in n the wordline (WL) direction and columns in the bitline (BL/BLN) direction. Each SRAM cell 305 includes NFETs N1, N2, N3, N4, PFETs P1 and P2 and optional capacitors C1 and C2. For each SRAM cell 305, the gates of NFETs N1 and N2 are coupled to a wordline, the drain of NFET N1 to a bitline (BL), and the drain of NFET N2 to a compliment bitline (BLN). The source of NFET N1 is connected to the gates of PFET P1 and NFET N4 and to drains of PFET P1 and NFET N3. The source of NFET N2 is connected to the gates of PFET P2 and NFET N3 and to drains PFET P2 and NFET N4. The sources of PFETs P1 and P2 are connected to VDD and the sources of NFETs N3 and N4 are connected to ground. Optional capacitor C1 is connected between the gate of NFET N1 and the wordline and the optional capacitor C2 is connected between the gate of NFET N2 and the wordline.

The sensitivity of individual cells 305 to an alpha particle strike can be controlled by changing the capacitance of capacitor C1 and C2 if present (the lower the capacitance the more sensitive the cell, the higher the capacitance, the less sensitive the cell). Alternatively, sensitivity of individual cells 305 to an alpha particle strike can be controlled by changing the gate areas of NFET N3 or PFET P2. In one example, in the pre-radiation exposure event (or pre soft error state) all cells in SRAM array 300 are storing a logical 1. In one example, in the pre-radiation exposure event (or pre soft error state) all cells in DRAM array 300 are storing a logical 0.

In operation, the data of an SRAM cell is stored at one output of the inverter and the other output of the inverter is the inverse or complement of the cell value. The isolation NFETS protect the value stored in the cell during pre-charging of the bitlines. The size of the isolation transistor is selected to optimize the circuit operation. A wordline (WL) control signal allows the cell to be accessed for reading or writing when needed and turns off access to the cell otherwise.

To write new data into an SRAM cell, external tri-state drivers are activated to drive the BL and BLN when the wordline transistors are enabled. Since the external drivers are much larger than the small transistors used in the 6T SRAM cell, they easily override the previous state of the cross-coupled inverters. A short-circuit condition arises (for a fraction of the WL select period) when changing the information.

To read information, the wordline is activated while the external bitline drivers are switched off. Therefore, the inverters inside the SRAM cell drive the bitlines, whose value can be read-out by external logic.

The bitlines are precharged with wordline low (or off). Pre-charging enables the charging of both bitlines before a write or read operation. Once the proper bitline value is selected/written, the other bitline is discharged.

6T SRAM cells are sensitive to mismatches in threshold voltages (VTs) between adjacent transistors and devices within the SRAM cell. A dopant implant is used to set the activation threshold of the MOS transistors. The total number of dopant atoms is a function of the area under the gate of a MOS transistor. At small gate areas, the number of dopant atoms becomes a statistically significant variable, and can cause large random mismatches in activation threshold voltages for neighboring devices.

Therefore, it is possible to design SRAM cells of having more or less SER sensitivity to a radiation event by:

(1) scaling the area under the gate (NFET N3 or PFET P2 of FIG. 9), thereby changing the number of dopant atoms available for charge recombination;

(2) scaling the voltage of the SRAM cell (higher voltage yields more cell stability);

(3) the addition of external capacitors (as described supra) and or resistors to the individual transistors or by putting these in parallel with, e.g., the BL or WL;

(4) using an SOI substrate (which greatly reduces the FET body volume); and (5) using a triple well device or a device using a metal gate.

Additionally, 6T SRAM arrays of various SER sensitivities could be made in adjacent regions of an integrated circuit chip, thereby fabricating a detector with sensitivities to different radiation environments.

Alternatively, an SER based radiation detector can be made using a standard (unmodified) SRAM cell with no hardware modifications. Only software code would be required to access the upset rate of a standard SRAM cell commercially available and readily found in PDA and cell phones.

Figure 10:
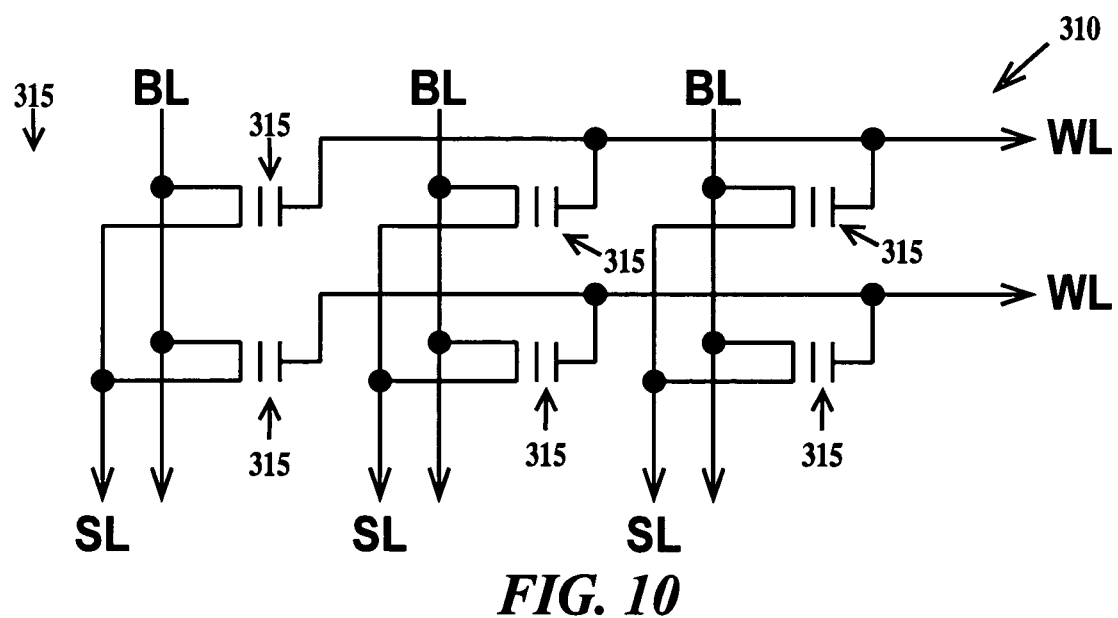
FIG. 10 is a schematic circuit diagram of a flash memory array that may be used as an active radiation detection event detecting element according to the second embodiments of the present invention.

FIG. 10 is a schematic circuit diagram of a flash memory array that may be used as an active radiation detection event detecting element according to the second embodiments of the present invention. In FIG. 10, a FLASH memory array 310 (suitable for use as first memory array 210 of FIG. 5) is comprised of rows in the wordline (WL) direction and columns in the bitline (BL) and source line (SL) direction of dual gate NFETs 315. Each NFET 315 comprises a source, a drain, a control gate and a floating gate. The control gate is stacked over the floating gate and separated by a dielectric. The floating gate is formed over the channel region of the NFET and separated from the channel region by a gate dielectric. For each NFET 315, the drain of the NFET is connected to a bitline, the source to a source line, the gate to a bitline and the body (containing the source, drain and channel regions) to ground.

The sensitivity of individual NFETs 315 to an alpha particle strike can be controlled by device area, dopant profile distribution and dopant concentration as well as other device parameters. In one example, in the pre-radiation exposure event (or pre soft error state) all NFETs 315 in FLASH memory array 310 are storing a logical 1. In one example, in the pre-radiation exposure event (or pre soft error state) all NFETS 315 in FLASH memory array 315 are storing a logical 0.

Figure 11:
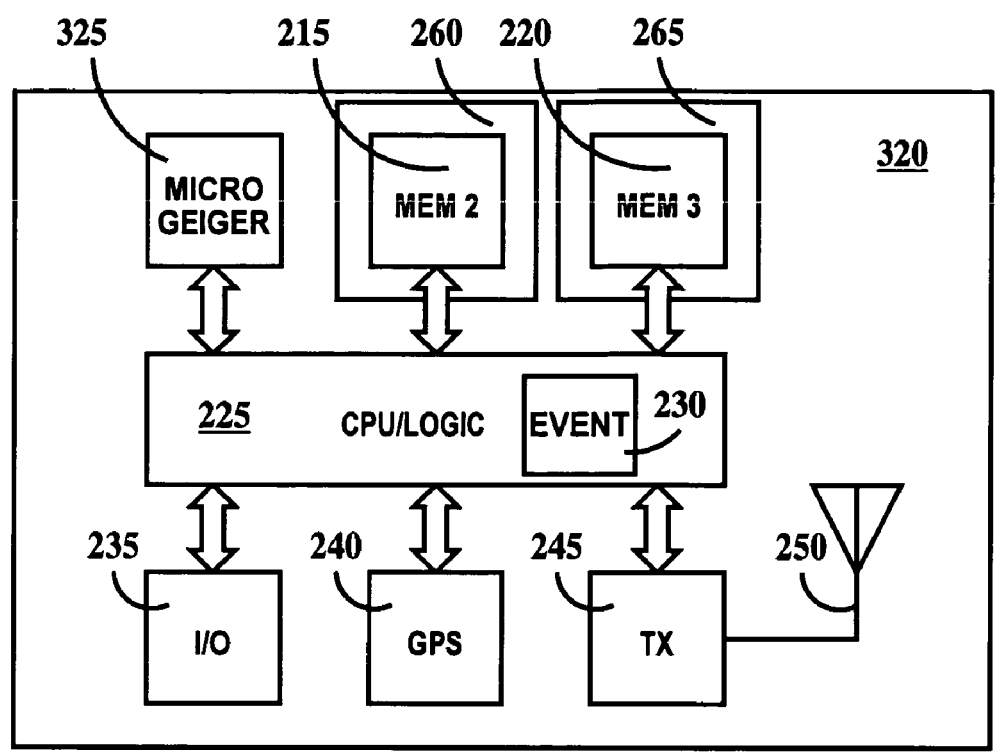
FIG. 11 is a schematic diagram of an active radiation detection device according to a third embodiment of the present invention.

FIG. 11 is a schematic diagram of an active radiation detection device according to a third embodiment of the present invention. In FIG. 11, a host device 320 is similar to host device 205 of FIG. 5 except for the fact that first memory array 210 and alpha particle generating plates 255 are replaced with a micro-Geiger counter 325.

Figure 12A:
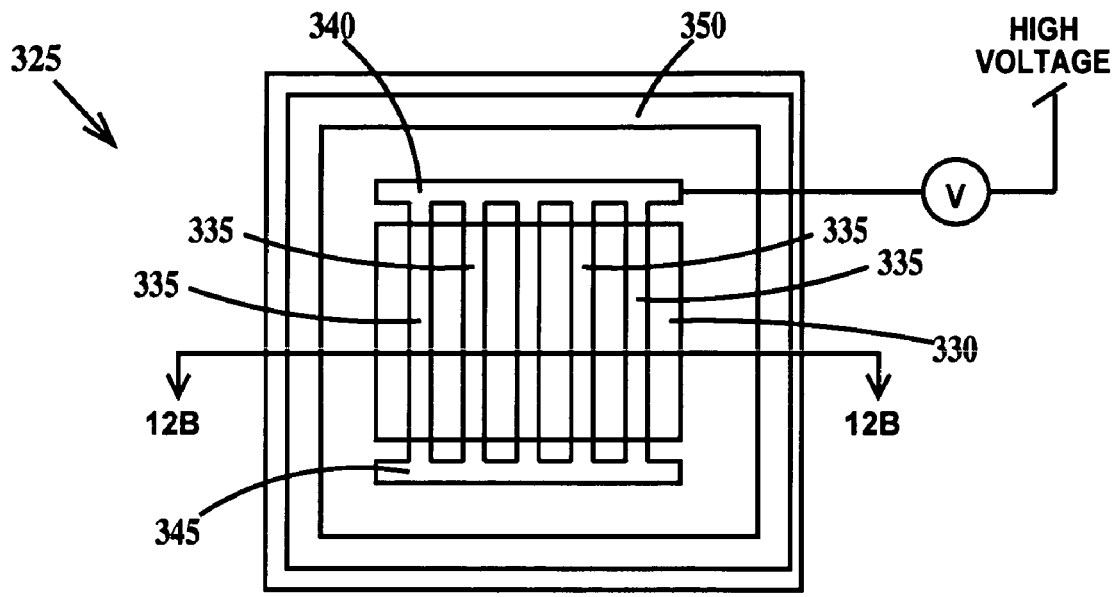
FIG. 12A is a plan view and FIG. 12B is a cross-sectional view through line 12B-12B of FIG. 12A of a radiation detection element according to the third embodiments of the present invention.
Figure 12B:
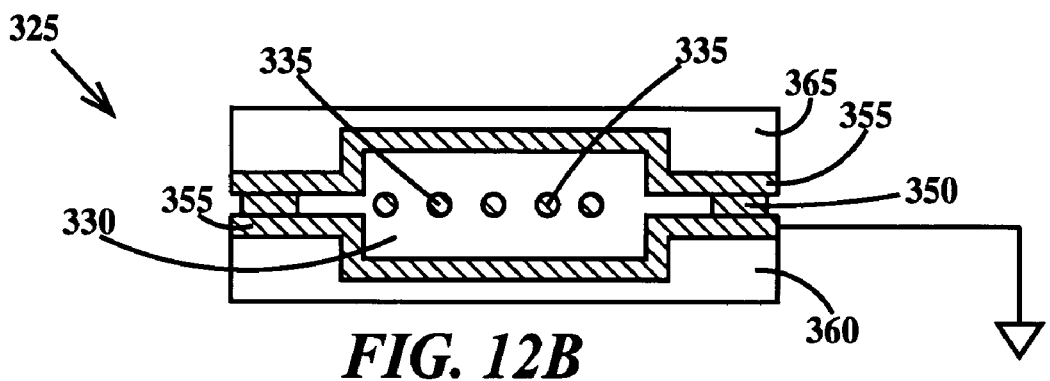

FIG. 12A is a plan view and FIG. 12B is a cross-sectional view through line 12B-12B of FIG. 12A of a radiation detection element according to the third embodiments of the present invention. In FIG. 12A, micro-Geiger counter 325 includes, suspended in a cavity 330, a multiplicity of metal wires 335. All first ends of wires 335 are integrally formed with a first bus bar 340 and all second ends of wires 335 are integrally formed with a second bus bar 345. Micro-Geiger counter 325 includes seal 350, whose use is illustrated in FIG. 12B. First bus bar 340 is coupled through a voltage meter to a high voltage source. Second bus bar 345 is electrically floating. In one example, the voltage of the high voltage source is between about 50 volts and about 100 volts. Those skilled in the art will recognize that the electric field, and voltage requirement is related to the wire diameter.

In FIG. 12B, it can be seen that cavity 330 is lined with conducting layer 355 and seal 350 connects a lid 365 to a base 360. Cavity 330 is filled with a gas that is ionized (a counter gas) by the passage of radiation. Conductive layer 355 is connected to ground of the high voltage supply. In one example, cavity 330 is filled with argon (Ar) as the ionizing gas and chlorine (Cl) as the quench gas. In another example, the cavity 330 is filled with helium (He) as the ionizing gas. To make micro-Geiger counter 325 sensitive to neutrons, the ionizing gas could be replaced with $^3$He or $BF_3$. An array of both micro-Geiger counter sensitive to gamma, x-ray and beta radiation (and not neutrons) and micro-Geiger counters sensitive to neutrons (and not gamma, x-ray or beta radiation) may be utilized to allow discrimination of the type of radiation detected.

Micro-Geiger counter 325 may be fabricated using conventional semiconductor techniques. An exemplary method of fabricating micro-Geiger counter 325 comprises:

(1) forming a trench in a silicon chip, forming a thin conformal layer of silicon nitride on all exposed silicon surfaces;

(2) filling the trench with oxide and polishing the oxide so it is coplanar with the silicon chip;

(3) forming wires 335 and bus bars 340 and 345, the bus bars not over the oxide fill, the wires over the oxide fill;

(4) removing the oxide fill, but not the silicon nitride;

(5) repeating steps (1) and (2) on another substrate to form a lid; and (6) joining the lid to the silicon chip with an airtight sealant in a chamber filled with the appropriate counter gas, listed here, but not limited to: Ar, He, $^3$He, Xe, $BF_3$ and an appropriate quenching gas.

An exemplary form of micro-Geiger counter 325 has following dimensions:

(1) the width of wire, 335 between about 1 micron and 5 microns;

(2) the distance between buss bars 340 and 345 between about 3 microns and about 25 microns;

(3) the length/width ratio of wires 335 between about 3:1 and 5:1.

(4) the depth of cavity 330 between about 100 microns and about 500 microns; and (5) adjacent wire 335 spacing of between about 500 microns and about 1000 microns. After processing the micro-Geiger counter, in a process flow as described supra, wires 335 will be nearly circular in cross section.

Whether the radiation detector is a memory array sensitive to soft error failures or a micro-Geiger counter, power can be saved by (1) periodically turning on the radiation detector to sample radiation levels, (2) powering only the radiation detector and turning on the host device when radiation is detected or (3) periodically switching the host device and the radiation detector from a power saving mode to a powered mode to sample radiation levels.

FIG. 13 is a schematic diagram of a scheme for collecting radiation detection information according to the second and third embodiment of the present invention. FIG. 13 is similar to FIG. 2 with the following exceptions. Reading device 145 of FIG. 2 is replaced by reading device 370 having an antenna 375 and PC 155 includes a wireless card and antenna 380. Also reading device 370 is adapted to physically connect (via plug and socket, not shown) to host device 205/320 or wirelessly communicate with reading device 370 via antennas 250 and 375. Alternatively reading device 370 can communicate with PC 155 via antennas 375 and 380 or through cable 385. Alternatively, host device 205/305 may communicate wirelessly with PC 155 via antennas 250 and 380.

Figure 14:
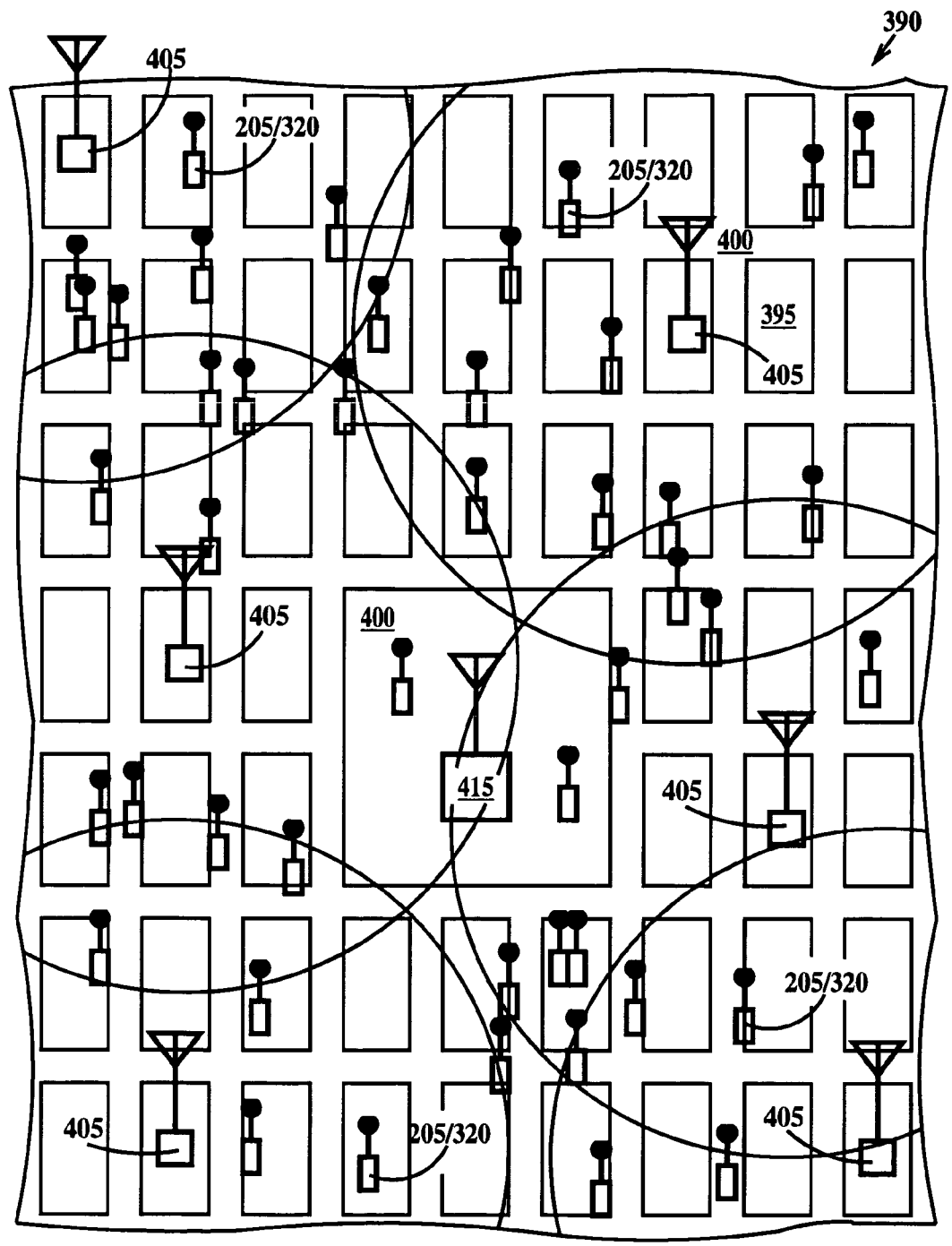
FIG. 14 is a diagram of a network for collecting radiation detection information according to the second and third embodiments of the present invention.

FIG. 14 is a diagram of a network for collecting radiation detection information according to the second and third embodiments of the present invention. FIG. 14 uses the example of host devices 205/320 being cell phones in a metropolitan area. However, the basic operation and structure of the network described can be applied to any of the host devices of the second embodiment of the present invention and is applicable to suburban and rural areas as well. In FIG. 14, a network 390 is superimposed over a metropolitan area which includes an arrangement of blocks 395 and streets 400. Dispersed throughout the metropolitan area are network components cell phone towers 405 and one or more radiation exposure event data collection units 415 located at an emergency facility which may include, but is not limited to hospitals, a police or fire stations and emergency vehicles. Radiation exposure event data collection units 415 may be wirelessly linked or hard wire linked to cell phone towers 405. Radiation exposure event data collection units 415 are adapted to generate radiation exposure dose maps and statistics based on the locations of cell phone towers 405. Radiation exposure event data collection units 415 may be adapted to receive radiation exposure event data directly from host devices 205/320. Because the locations of cell phone towers 405 are fixed (and thus known) the average and range of exposure in a known area can be easily determined as well as an approximation of the number and seriousness of casualties, thus providing important triage information so as not to send emergency response units to areas where they can not be effective. Additionally cell phone towers 405 themselves may be fitted with any of the active radiation detection devices of the various embodiments of the present invention. Because cell phone towers 405 are fixed, the radiation detection devices can be quite substantial and directional.

Thus, the various embodiments of the present invention provide radiation detection schemes and apparatus and methods of transmitting radiation detection information to networks that address healthcare triage and an estimate of the radiation level and potential victim geographical distributions.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A method, comprising:

communicating with one or more personal radiation detection devices, each personal radiation detection device of said one or more personal radiation detection devices comprising: a host device including, a host memory, an event memory, a microprocessor, a global positioning unit and a transceiver or a transmitter;

a radiation shield around said host memory and said event memory; a radiation detection memory, said radiation detection memory responsive to alpha radiation, said radiation detection memory comprised of two or more SRAM arrays, each SRAM of said two or more SRAM arrays array comprising cross-coupled invertors coupled to bitlines through pass-gate field effect transistors, gates of said pass-gate field effect transistors coupled to wordlines through capacitors, capacitors of different SRAM arrays of said two or more SRAM arrays having capacitors of different capacitance;

a conversion layer device proximate to said radiation detection layer memory, said conversion layer device comprising a material able to convert neutron, gamma or neutron and gamma radiation into alpha radiation; and an event detection circuit within said host device, said event detection circuit configured to detect and to store data relative to detection of said alpha radiation events by said radiation detection memory in said event memory, said data including a soft error fail rate of each SRAM array of said radiation detection memory and a location of said personal radiation detection device when said alpha radiation was detected;

storing said data in said event memory;

retrieving, in a reading device, said data stored in said event memory;

determining, in said reading device, a radiation dose said host device has been exposed to based on data stored in said event memory; and displaying (i) on a display unit of said reading device, said radiation dose and a location of said personal radiation detection device when said alpha radiation event was detected, (ii) on a computer screen of a computer linked to said reading device or (iii) on said display unit of said reading device and on said computer screen of said computer.

2. The method of claim 1, further including:
determining a medical treatment based on a protocol based on exposure of a human body to said radiation dose displayed on said reading device.

3. The method of claim 1, wherein said retrieving said data stored in said event memory includes physically placing said personal radiation detection device into said reading device.

4. The method of claim 1, wherein said host device is a cell phone and further including:
storing, in said event memory, an identification of a cell tower in communication with said host device when said radiation detection device detects a radiation exposure event.

5. The method of claim 1, further including:
periodically turning on said radiation detection memory, said microprocessor, said event memory, said host memory and said event detection circuit, sampling radiation levels, storing data relative to said sampling in said event memory and then turning off said radiation detection memory, said microprocessor, said event detection circuit, said host memory and said event memory.

6. The method of claim 1, wherein said two or more SRAM arrays are formed in a silicon chip and said conversion layer resides in a layer of said silicon chip.

7. The method of claim 1, wherein said radiation detection memory is contained in a wire bonded integrated circuit.

8. The method of claim 1, wherein said radiation detection memory is contained in a flip-chip bonded integrated circuit.

9. The method of claim 1, wherein said conversion device comprises a first plate proximate to a bottom surface of said radiation detection memory and a second plate proximate to a top surface of said radiation detection memory.

* * * * *